Figure 9C:
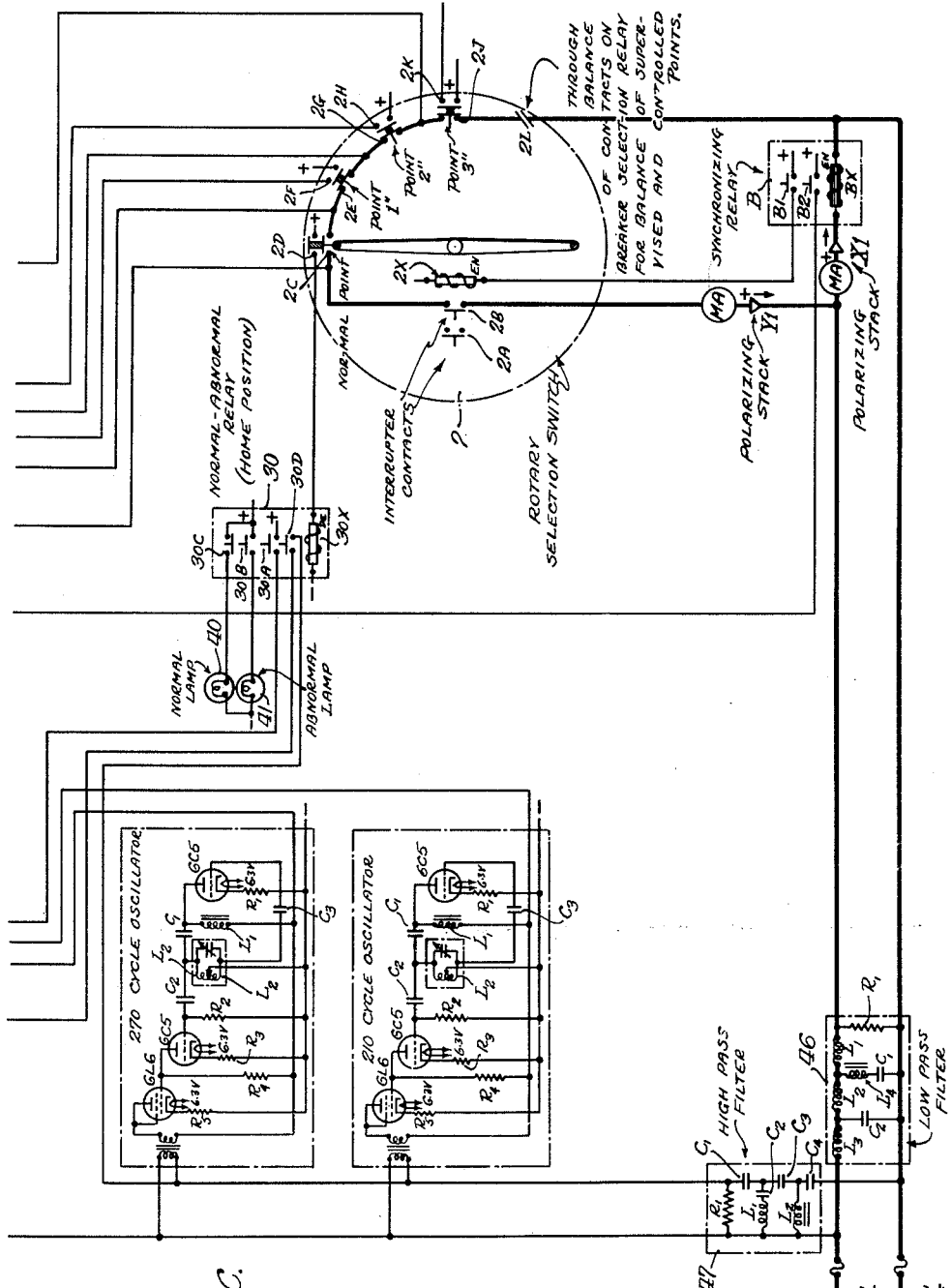

Nov. 21, 1944.  J. R. HARRINGTON  2,363,061
SUPERVISORY CONTROL SYSTEM
Filed Feb. 14, 1942  7 Sheets-Sheet 1
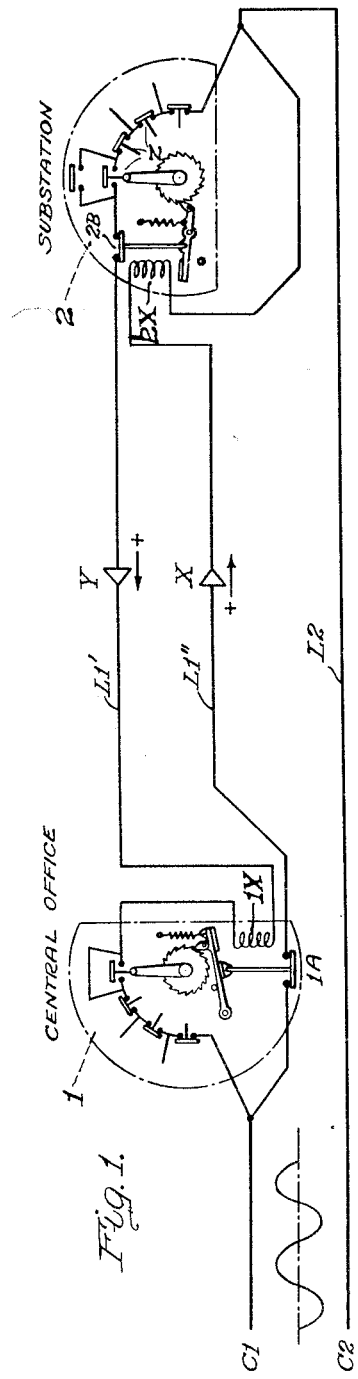
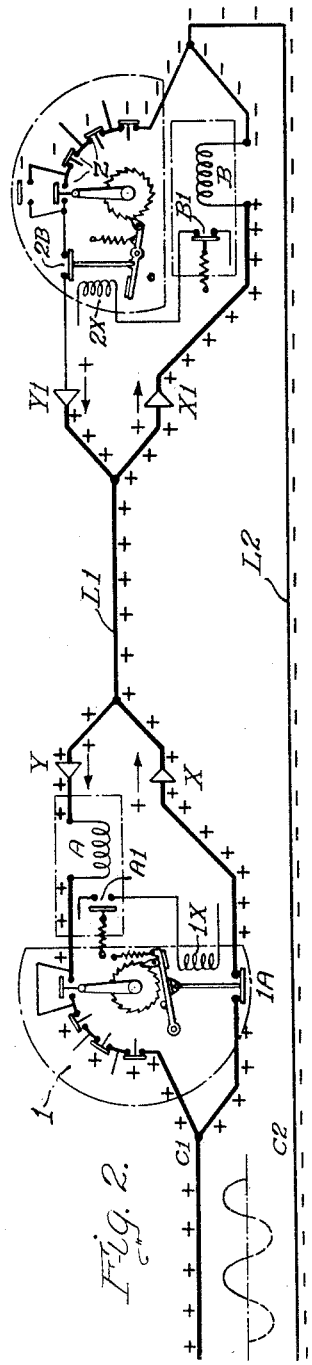
INVENTOR.
James R. Harrington
BY Nov. 21, 1944.  J. R. HARRINGTON  2,363,061
SUPERVISORY CONTROL SYSTEM
Filed Feb. 14, 1942  7 Sheets-Sheet 2
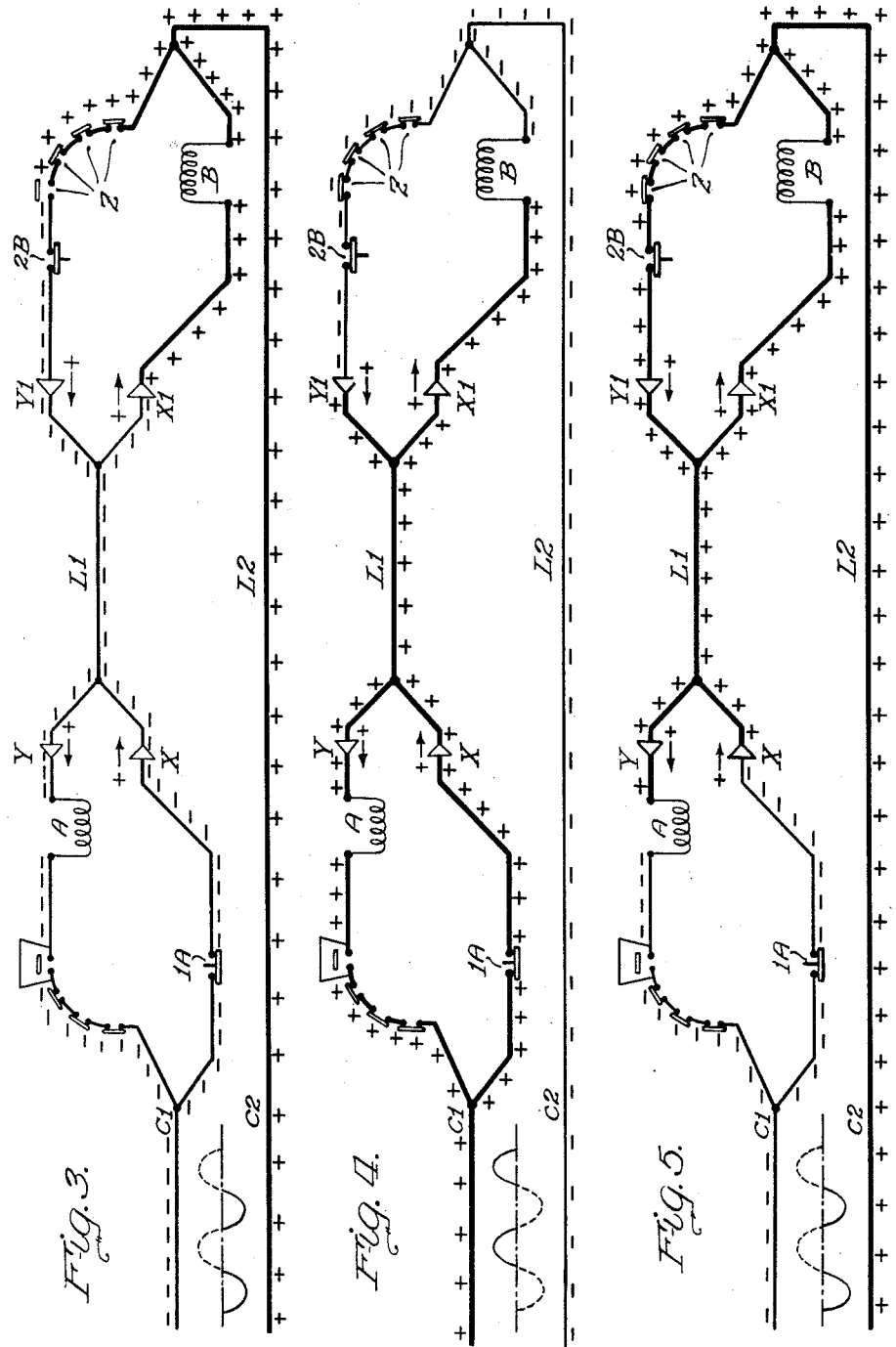
INVENTOR.
James R. Harrington
BY
*[signature]* Attys.

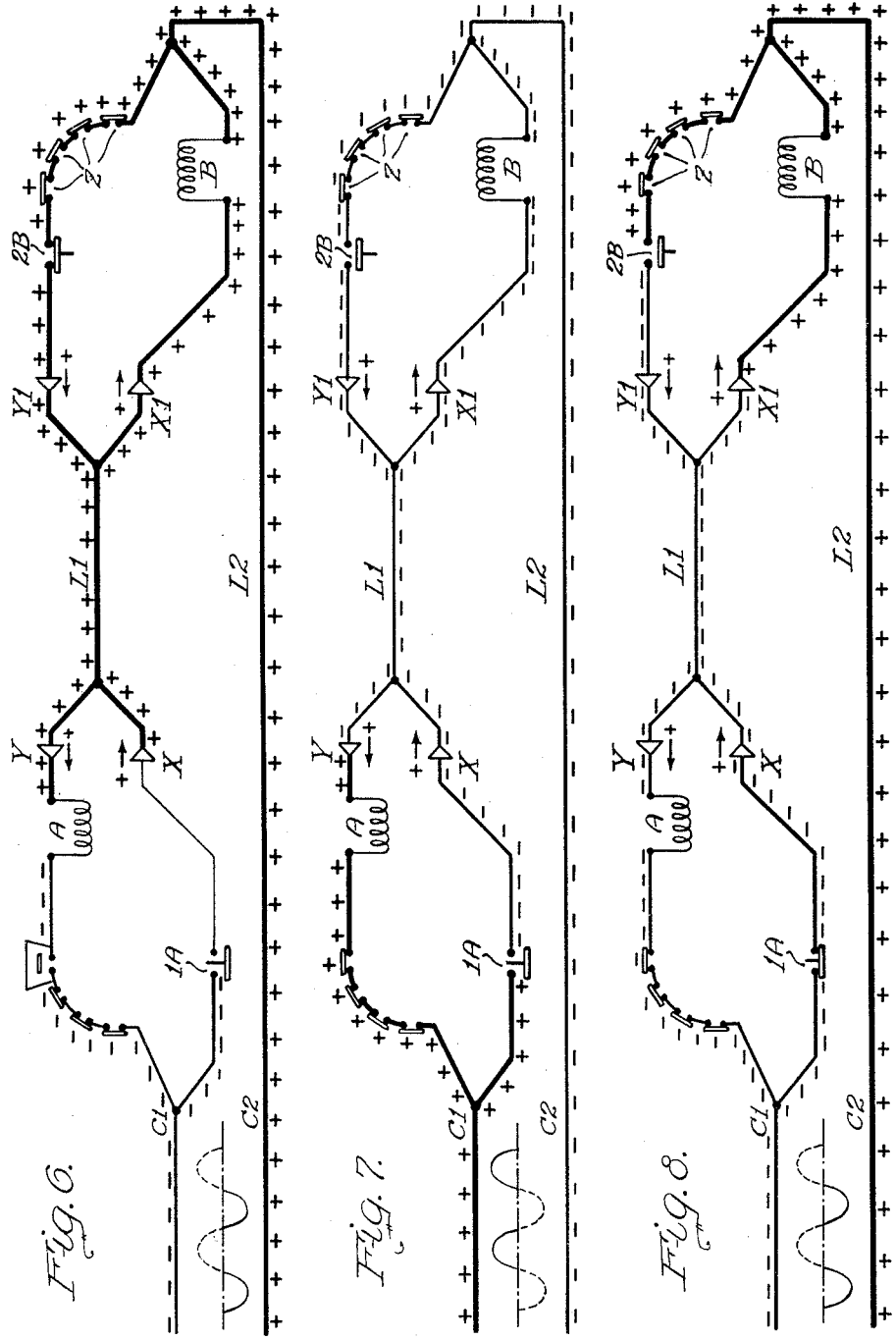

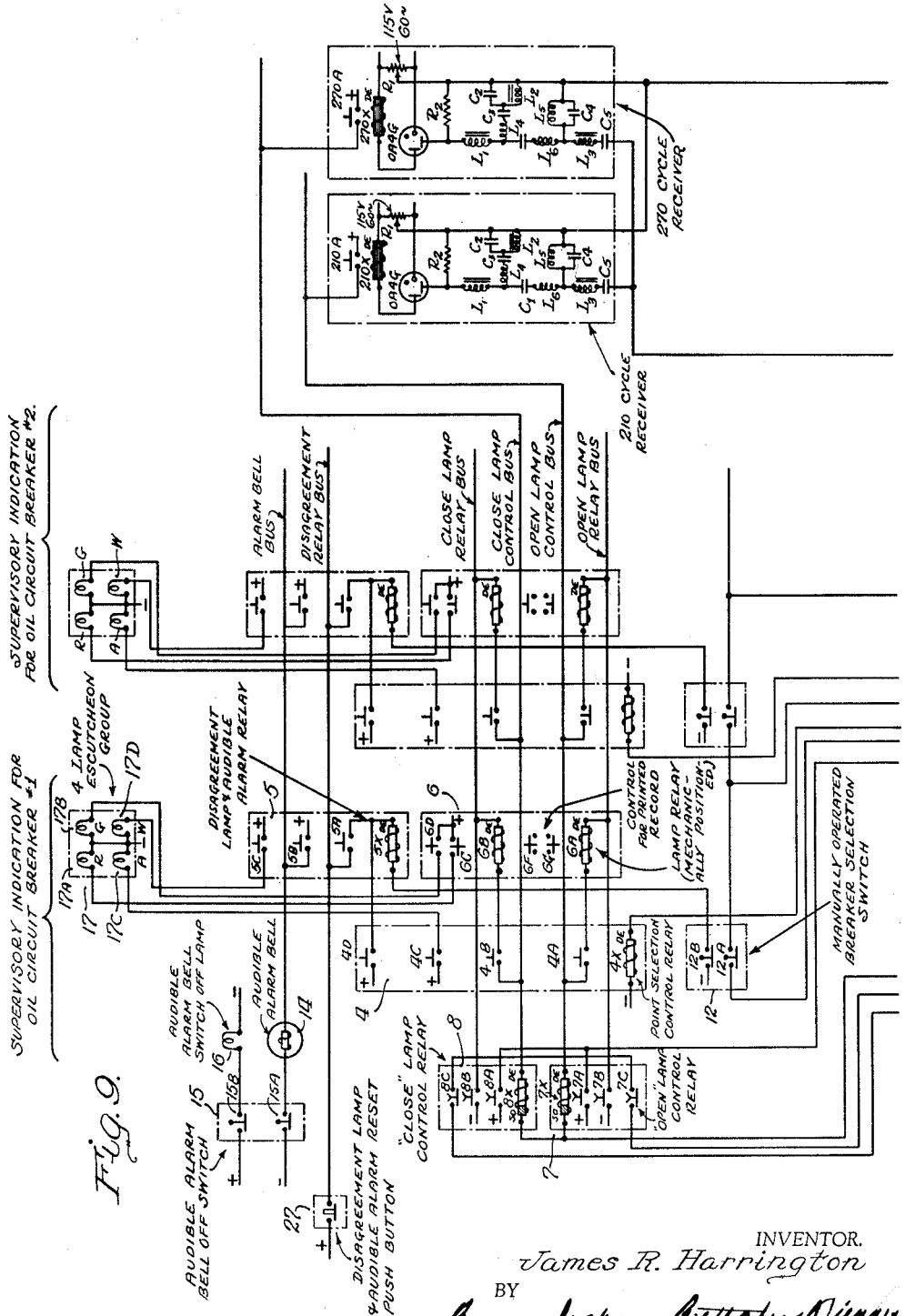

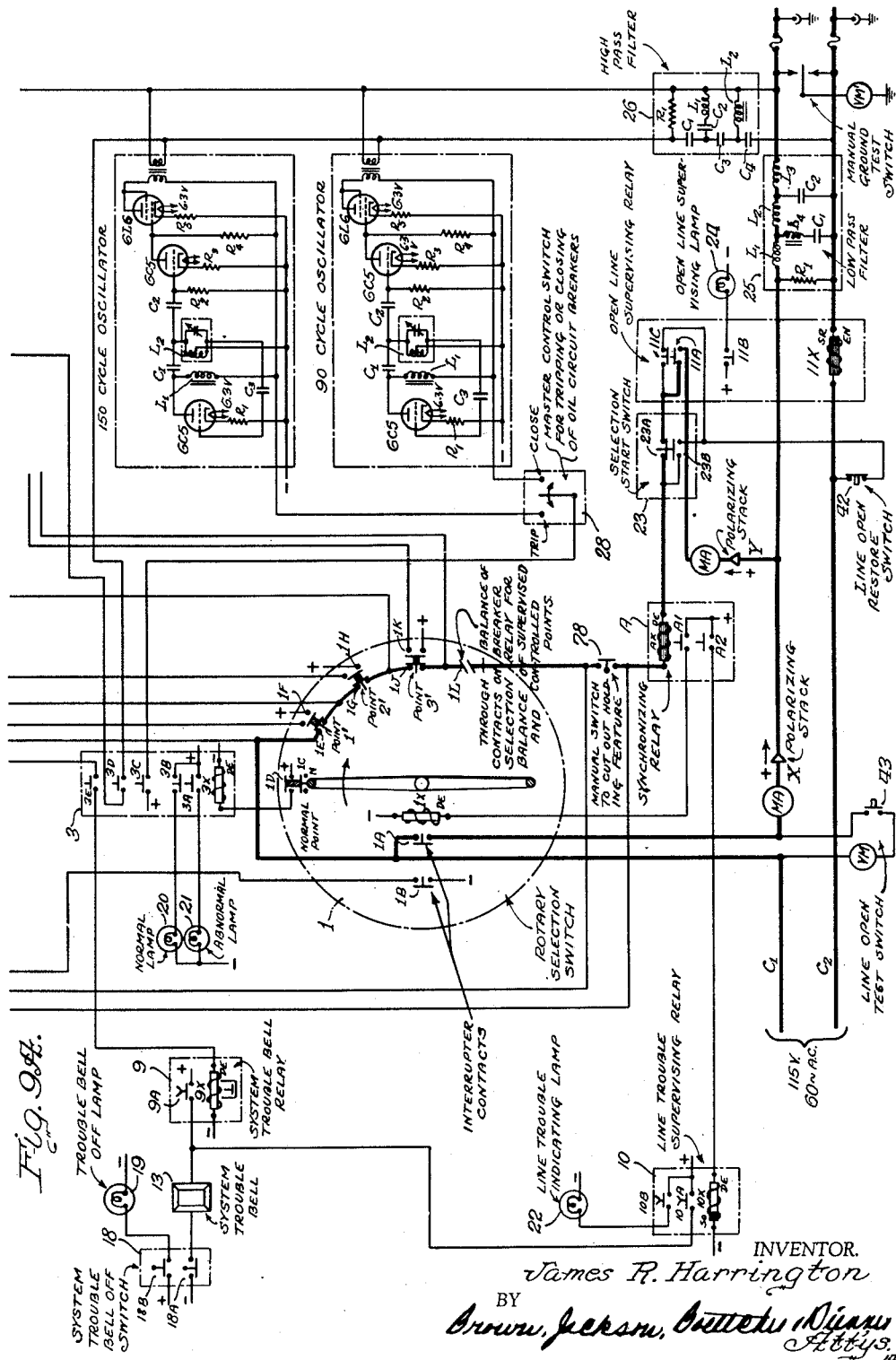

Nov. 21, 1944.   J. R. HARRINGTON   2,363,061
SUPERVISORY CONTROL SYSTEM
Filed Feb. 14, 1942   7 Sheets-Sheet 6
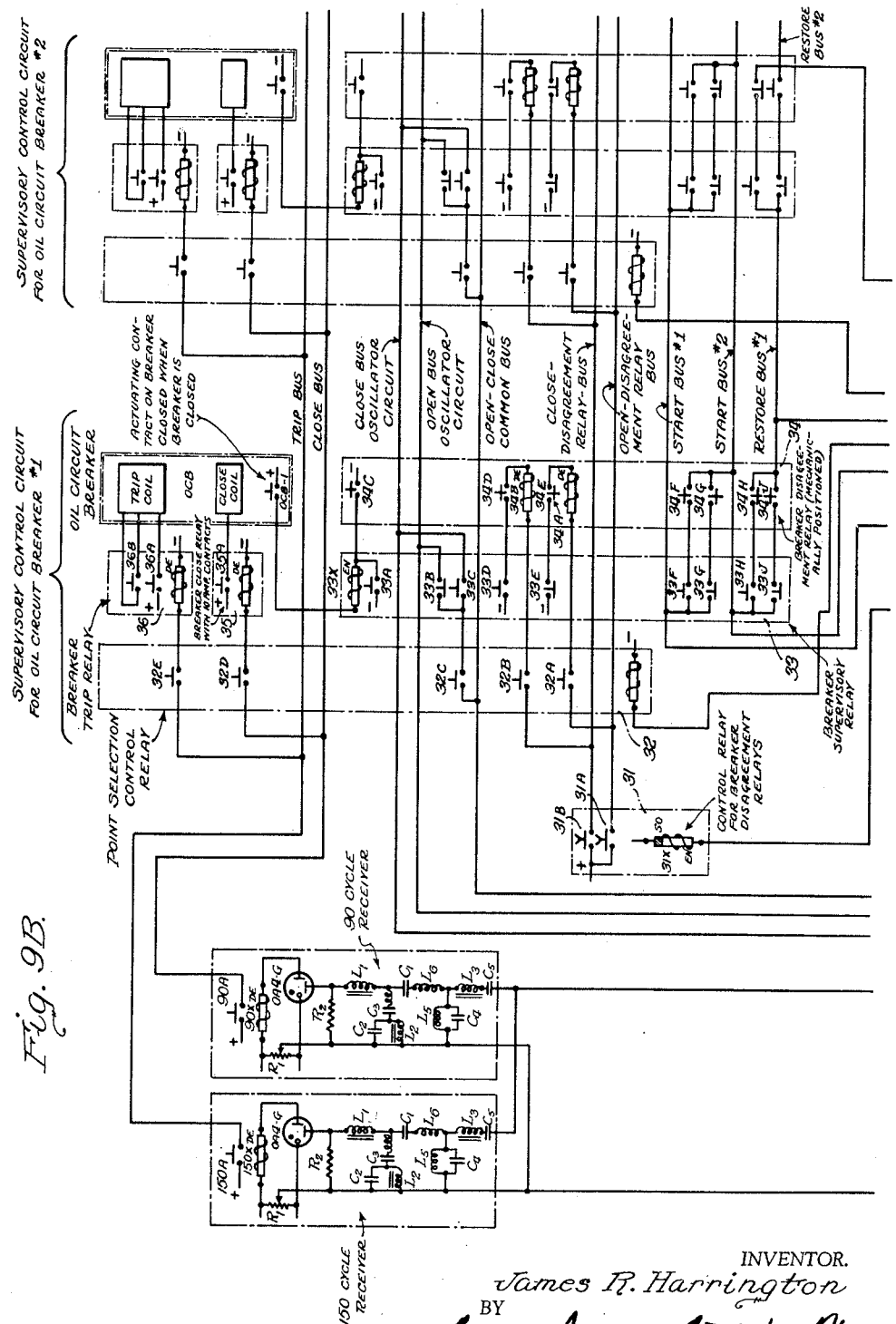
INVENTOR.
James R. Harrington
BY
Brown, Jackson, Boettcher & Dienner
Attys.

Nov. 21, 1944.    J. R. HARRINGTON    2,363,061
SUPERVISORY CONTROL SYSTEM
Filed Feb. 14, 1942    7 Sheets-Sheet 7

INVENTOR.
James R. Harrington
BY
[signature]

Patented Nov. 21, 1944

2,363,061

UNITED STATES PATENT OFFICE 2,363,061

SUPERVISORY CONTROL SYSTEM

James R. Harrington, Mansfield, Ohio, assignor to The Autocall Company, Shelby, Ohio, a corporation of Ohio Application February 14, 1942, Serial No. 430,934

25 Claims. (Cl. 177—353)

The present invention relates to an improved electrical system for establishing signalling, supervising and controlling communication between remotely located stations of electric power networks and the like.

The improved system of the present invention provides, by electrical means over a single pair of interconnecting conductors of the standard telephone type, the selective control and supervision at a centrally located point of any number of units of equipment or apparatus at a remotely located point.

My improved system embodies the use of two rotary stepping relays, one located at the central point and one at the remotely located point. The relays are automatically kept in synchronization by impressing an alternating current or continuously varying current on the interconnecting conductors, and transmitting portions of this current alternately back and forth between the control point and the remotely located point.

The rotary stepping relays located at the separated points or stations are automatically kept in synchronization in the event of any of the following abnormal conditions: open line, shorted line, mechanical or electrical failure, system power failure, or grounded line. No factor of either a mechanical or electrical trouble condition will affect synchronization.

More specific features, objects and advantages of the invention will appear from the following detailed description of one preferred embodiment of the invention. In the accompanyings drawings illustrating such embodiment:

Figure 1 is a schematic circuit diagram prepared for the purpose of facilitating an understanding of the basic operating principles of the invention, this diagram showing the invention embodied in a three conductor circuit before the evolution of the invention into a two conductor circuit, and also showing the line conductors energizing the rotary stepping relay coils directly, without the the interposition of synchronizing or pilot relays;

Figure 1A is a chart of the legends and symbols used in the circuit diagrams;

Figures 2 to 8, inclusive, are schematic circuit diagrams, substantially similar to Figure 1 but showing the invention embodied in a two conductor circuit instead of a three conductor circuit, and also showing synchronizing or pilot relays interposed between the line conductors and the actuating coils of the rotary stepping relays, these successive figures showing the different directions of current flow, the different conditions of polarity, the different energizations of the relays, etc., in the different operating stages of the system;

Figures 9, 9A, 9B, and 9C are related parts of a complete circuit diagram of the preferred form of my improved system. Figures 9 and 9A, when joined top and bottom, represent the central office or central station of the system. Figures 9B and 9C, when joined top and bottom, represent the substation or other remotely located station of the system. The entire system is illustrated complete when Figures 9 and 9A, joined top and bottom, are placed along the left margin of Figures 9B and 9C, joined top and bottom.

Referring first to the three wire basic diagram of Figure 1, the rotary stepping or selecting switch 1 at the central station and the rotary stepping or selecting switch 2 at the substation are interconnected by the three conductors L1', L1'', and L2, and are powered from the central office by a 60 cycle current or its equivalent impressed on the supply conductors C1 and C2. A 60 cycle alternating current is preferable for the reason that it is a standard source of current supply which is readily available; also for the reason that the 60 cycle frequency coordinates advantageously with other frequencies which are superposed on the system for supervising and control purposes; and for other reasons. However, in lieu of a 60 cycle alternating current, other alternating currents of different frequencies may be employed, or direct currents which are pulsated or varied, periodically or continuously, may be employed, or various combinations of such alternating and direct currents. The actuating coils 1X and 2X respectively of the rotary switches 1 and 2 are energized in predetermined sequence or operating relation by rectified or polarized current passing through the rectifying or polarizing stacks X and Y interposed in conductors L1' and L1'' respectively. These polarizing stacks are typically represented by copper oxide rectifiers or the like. The stacks are arranged in the circuit so that positive current will pass through the stacks in the direction indicated by the arrows. Positive current is blocked from passing through the stack when impressed on the stacks in the opposite direction to that indicated by the arrows. Negative current is blocked from passing through the stacks in the same direction as positive current, but will pass through the stacks in the opposite direction to positive current.

A 60 cycle power impressed on the circuit at the source on conductors C1 and C2 is constantly alternating the positive and negative polarities on the conductors. That is, conductor C1 is positive polarity and conductor C2 is negative polarity for one-half a cycle. On the other half of the cycle, conductor C1 is negative polarity and conductor C2 is positive polarity. Thus, the constant alternation of the positive and negative polarities on conductors C1 and C2 is controlled in the circuit by the use of the polarizing stacks to allow the positive or negative current to pass in the circuit only where desired.

The rotary selection switch 1 at the central station has an actuating coil 1X which attracts an armature carrying a stepping pawl for imparting step-by-step motion to a ratchet wheel which advances the rotating arm of the switch 1. The operating relation is such that the advancing motion occurs on the retraction of the armature, when the coil 1X is deenergized. Also responding to the motion of the armature through a suitable mechanical connection is an interrupter contact 1A, the operating relation at this central station relay being such that said interrupter contact closes when the coil 1X is deenergized and the armature retracts. In the system illustrated in Figure 1, the coil 1X is interposed in series in line conductor L1', and the interrupter contact 1A is interposed in series in the line conductor L1''.

The rotary selection switch 2 at the substation also has an actuating coil 2X which attracts an armature carrying a stepping pawl for imparting step-by-step motion of a ratchet wheel which advances the rotating arm of the switch 2. Here again the operating relation is such that the advancing motion occurs on the retraction of the armature, when the coil is deenergized. This substation switch 2 also has an interrupter contact 2B which is mechanically connected to the armature. However, the operating relation of this interrupter contact is reversed from that shown in the central station switch, because in the case of this substation switch the interrupter contact 2B opens when the coil deenergizes and the armature retracts. In the system illustrated in Figure 1, the coil 2X is interposed in series in line conductor L1'', and the interrupter contact 2B is interposed in series in line conductor L1'. As exemplifying a preferred construction of rotary selecting switch serving as the switches 1 and 2, attention is directed to the construction disclosed in the prior patent of James R. Harrington and Boyd H. Smith, No. 2,284,816, issued June 2, 1942.

Referring now to the circuit diagram of Figure 2. this shows conductors L1' and L1'' combined into the form of a single conductor L1, so that the interconnecting circuit wires between the central station and the substation are reduced from the three conductors L1', L1'', and L2 to two conductors, L1 and L2. This step of combining conductors L1' and L1'' is effected by making the polarizing stacks X and Y individual to the central station at that end of conductor L1, and by adding a second pair of similar polarizing stacks X1 and Y1 at the other end of conductor L1 and making these latter stacks individual to the substation. One significant effect which follows from this arrangement of the four polarizing stacks in Figure 2 is that the full negative potential cannot at any time be fully impressed upon line L1 for causing full negative current to flow through this line. For example. polarizing stack X blocks full negative current from passing through to line L1 when conductor C1 is negative, and polarizing stack Y1 blocks full negative current from passing through to line L1 when conductor C2 is negative.

In the more developed form of the invention shown in Figure 2, I have also interposed the synchronizing or pilot relays A and B between the line conductors and the actuating coils 1X and 2X of the rotary switches 1 and 2 respectively. The coil of synchronizing relay A is interposed in series between the selection contacts of rotary switch 1 and the polarizing stack Y. The armature contact A1 of this synchronizing relay A controls a local circuit which energizes the actuating coil 1X of the stepping switch 1 whenever the synchronizing relay is energized. Referring now to the synchronizing relay B for the substation rotary switch 2, the coil of this synchronizing relay is interposed in series between line conductor L2 and the polarizing stack X1. The armature contact B1 of this synchronizing relay B controls a local circuit which energizes the actuating coil 2X of the stepping switch 2 whenever the synchronizing relay is energized. The provision of the synchronizing or pilot relays A and B enables a relatively feeble current to be employed on the main line conductors L1 and L2, while supplying a relatively large current to the actuating coils 1X and 2X of the rotary selection switches 1 and 2.

The complete circuit diagram of Figures 9, 9A, 9B and 9C will be more easily understood by first briefly describing the basic operating principle of the system in connection with Figures 2 to 8 inclusive. The circuit diagram of Figure 1 may also be considered in this description, this diagram representing an evolutionary step in the development of the basic operating principle wherein three main line conductors are employed instead of the two conductors of the later diagrams, and wherein the rotary switches 1 and 2 have direct connection in the main line circuit instead of through the relays A and B. Referring to Figures 1 to 8, inclusive, each rotary selection switch 1 and 2 includes a group of supervised and controlled contact points which are automatically opened or closed, with each contact point or switching point automatically selected by the step-by-step operation of the two rotary switches 1 and 2. These contact points comprise a succession of series connected line contacts interposed in the main circuits of the central station and substation, being interposed in series with the coil of synchronizing relay A at the central station, and being interposed in series with the interrupter contact 2B at the substation. Such series connected contacts are successively opened in the stepping of the rotary switch arms, as better shown in Figures 9A and 9C. To facilitate the description of the relatively brief schematic diagrams shown in Figures 1, 2, 3, etc., I shall refer collectively to this group of series connected contacts at the rotary switch 2 of the substation as the contacts Z. When this rotary switch at the substation stands in its normal position, the switch arm maintains one of these contacts Z in open position. When a supervisory indication is initiated at the substation, this contact Z is shunted or closed. Figures 1 and 2 have been drawn to illustrate the synchronizing relay contacts A1 and B1, together with the stepping magnets, stepping pawls, etc., of the rotary switches, but these elements have been omitted from the succeeding diagrams of Figures 3 to 8 inclusive, because the latter diagrams are merely repetitions of Figure 2 under different operating conditions. Accordingly, Figures 3 to 8, inclusive, only show the more important elements necessary to an understanding of the basic operating principles, such as the coils of the relays A and B and the interrupter contact 1A and 2B.

With the circuit energized and at rest, relay B is normally energized with contact 2B closed, and relay A is deenergized with contact 1A closed. The circuit is then open at Z.

Referring particularly to Figure 2, on the half cycle when conductor C1 is positive current and conductor C2 is negative current, a positive potential is maintained through contact 1A and thence through polarizing stack X over line L1 to polarizing stacks X1 and Y1. Positive potential is indicated in these circuit diagrams by illustrating the conductor with a relatively heavy line and by appending successive plus signs along this conductor. This positive potential is blocked at stack Y1 but passes through stack X1 to the coil of relay B. Negative potential is transmitted over line L2 to the coil of relay B, and to the open circuit at Z. Negative potential is indicated in the circuit diagram by a medium weight of line for the conductor, and by appending successive minus signs along the conductor. A neutral or no polarity condition of a conductor is indicated by a relatively light line. In the above described condition illustrated in Figure 2, the coil of relay B receives both positive and negative potential, and hence it energizes and remains energized on this half cycle of the 60 cycle current until the circuit at interrupter contact 1A is opened.

Referring to Figure 3, on the other half cycle of the 60 cycle current, when conductor C1 is negative current and conductor C2 is positive current, negative potential passes to relay A and also through contact 1A, but is blocked at stack X1. Positive potential passes over line L2 to relay B and to the open circuit at Z. On this half cycle of the 60 cycle current neither relay receives both positive and negative current. Relay A remains in the deenergized position, and relay B remains in the energized position. Relay B remains energized during this period of 1/60 of a second, more or less, due to its characteristic of design in which it will not release, or is relatively slow acting during such a time period after cessation of current. The relay A will remain in its deenergized position and the relay B will remain in its energized position until the circuit at contact Z is closed.

Referring to Figure 4, upon the closing of the circuit at contact Z, when conductor C1 is positive and conductor C2 is negative, positive current passes through contact 1A and thence through stack X and over line L1 and through stack X1 to the coil of relay B. Negative current passes over line L2 to the coil of relay B and also passes through the closed circuit at contact Z, and through closed contact 2B to stack Y1. Positive and negative current are blocked at stack Y1. Relay B continuing to receive both positive and negative current remains energized. Relay A remains deenergized.

Referring to Figure 5, on the other half cycle when conductor C1 is negative and conductor C2 is positive, negative current passes to the coil of relay A, and also passes through closed contact 1A to stack X. Negative current is blocked at stack X. Positive current passes over line L2 to relay B, through the closed circuit at contact Z, through the closed contact 2B, and thence through stack Y1 over line L1 to stacks X and Y.

Positive current is blocked by stack X, but passes through stack Y to the coil of relay A. The coil of relay A now receives both positive and negative current and immediately energizes. At this period both relays A and B will remain energized until contact 1A opens. Relay A receives both positive and negative current on the half cycle when conductor C1 is negative and conductor C2 is positive, and relay B receives both positive and negative current on the other half cycle when conductor C1 is positive and conductor C2 is negative.

Relay A can energize or remain energized only on the half cycle of the 60 cycle current when conductor C1 is negative, conductor C2 is positive and the circuit is closed at contact Z and contact 2B.

Relay B can energize or remain energized only on the half cycle of the 60 cycle current when conductor C1 is positive, conductor C2 is negative and the circuit is closed at contact 1A.

Referring now to Figure 6, this diagram is substantially the same as Figure 5 since it shows the same condition with relay A energized when conductor C1 is negative and conductor C2 is positive. However, Figure 6 differs from Figure 5 in showing interrupter contact 1A open, which follows immediately upon the energization of relay A.

Referring to Figure 7, upon the opening of interrupter contact 1A, positive current is removed from the left hand terminal of the coil of relay B on the next half cycle when conductor C1 is positive and conductor C2 is negative, whereupon relay B deenergizes and opens contact 2B.

Referring to Figure 8, the opening of contact 2B removes positive current from the right hand terminal of the coil of relay A on the next half cycle when conductor C1 is negative and conductor C2 is positive, whereupon relay A deenergizes and closes interrupter contact 1A.

Upon the closing of contact 1A, positive current is again fed to the coil of relay B, and the relay energizes, thereby closing contact 2B. The closing of contact 2B again feeds positive current to the coil of relay A and the relay energizes, opening contact 1A and removing positive current from the coil of relay B. This relay deenergizes, thereby opening contact 2B. This alternate step-by-step operation of the two rotary switches will continue until the circuit at Z is opened. Upon the opening of the circuit at Z, relay B remains energized and relay A remains deenergized, corresponding to the normal condition of the system illustrated in Figure 2.

As previously described, the circuit control indicated at Z represents a group of supervised and controlled points, and is automatically opened or closed, with each point automatically selected by the step-by-step operation of the two rotary switches 1 and 2.

In summarizing the basic operating principle described above in connection with Figures 1 to 8, inclusive, it will be seen that the alternate step-by-step operation of the two rotary switches in the two stations is brought about by the stations alternately transmitting positive current impulses or alternations back and forth between each other. For example, the substation transmits a positive current impulse to the central station (Figure 5) to effect a stepping operation of the rotary switch 1 of the central station, and, conversely, the central station transmits a positive current impulse back to the substation (Figure 2) to effect a stepping operation of the rotary switch 2 of the substation. This handling of positive current impulses back and forth between the stations is essential in order to bring about the step-by-step operation of the rotary switches. Without these impulses being thus handed back and forth in sequence, the rotary switches cannot step. Thus, a positively synchronized relation is maintained between the two stations in all signalling, supervising and controlling operations.

Although I have thus far only described a supervisory type of operation wherein the operation of the system is initiated by a supervisory condition originating at the substation, this same synchronized stepping of the two rotary switches 1 and 2 is also made to occur when the operation of the system is initiated by a control operation originating at the central station, such as a control operation performed at the central station for closing or opening a particular circuit breaker at the substation. This will be more apparent from the detailed description of the main circuit diagram of Figures 9–9C. In regard to this matter of the operation of the system being initiated either from the substation end or the central station end, it should be particularly noted that the rotary switch 1 can function alternately as a transmitter and as a receiver, and, likewise, the rotary switch 2 can function alternately as a transmitter and as a receiver.

*Main circuit diagram of Figures 9–9C*

Referring now to the main circuit diagram illustrated in sections in Figures 9, 9A, 9B and 9C, the circuit is shown as being arranged for effecting the automatic supervisory indication and the selective remote control of oil circuit breakers, rotary converters, and any other pieces of apparatus in a substation that it is desired to supervise or control. The following description first deals with the automatic supervisory indication of the automatic tripping of an oil circuit breaker, followed by the description of the reclosing of the oil circuit breaker by remote control. In view of the fact that the functions of the polarizing stacks X, X1, Y, and Y1 and the alternating of the positive and negative polarity of the 60 cycle current on conductors C1 and C2 for the synchronizing operation of the rotary stepping switches 1 and 2, have been previously described in detail in connection with the schematic or basic diagram of Figures 1 to 8, inclusive, it should be understood that these previously described functions shall apply for the remainder of the description without being fully described in detail for each operation. In order to simplify and mark off the successive operations as they occur, the successive paragraphs of that portion of the description pertaining to supervisory indications have been designated S1, S2, etc., and the successive paragraphs of that portion of the description pertaining to remote control have been designated C1, C2, etc.

*Supervisory indication of breaker open signal*

S1.—The automatic tripping of the oil circuit breaker OCB at the substation opens the supervising contacts OCB—1 on the breaker. The opening of the supervising contact OCB—1 on the breaker removes current from the coil of the breaker supervising relay 33. The relay deenergizes, opening contacts 33A, 33C, 33D, 33F, and 33H and closing contacts 33B, 33E, 33G, and 33J. Contact 33A closes the locking current to the coil; the closing of contact 33G closes the circuit across start bus #1 through closed contact 34G on breaker disagreement relay 34 to start bus #2. Contact 33H opens the circuit between start bus #2 and restore bus #1. The opening of contact 33H removes the shunt across contacts 2E on point 1 of rotary breaker selection relay 2.

S2.—The shorting of start bus #1 and start bus #2 shunts contact 2C on the breaker selection relay 2. The shunting of contact 2C closes positive current from line L2 through contacts 2L, 2J, 2G, 2E, 2C, and 2B to the polarizing stack Y1. Positive current passes through polarizing stack Y1, over line L1 to the central office through polarizing stack Y and through closed contacts 11A and 23A to the coil of synchronizing relay A. Negative current at the other side of the coil of synchronizing relay A is fed from conductor C1, through contacts 1E, 1G, 1J, 1L, and manual switch 78. On this half cycle of the 60 cycle current stack X is blocking to both positive and negative current. This corresponds to Figure 5 of the schematic diagrams.

S3.—Relay A energizes, closing contacts A1 and A2. The closing of contact A1 energizes the operating coil 1X of breaker selection switch 1. The energizing of coil 1X opens contacts 1A and 1B. Contact 1B opens the circuit to the "open" and "close" lamp control relays 7 and 8. The opening of contact 1A removes positive current from polarizing stack X, line L1, polarizing stack X1 and the coil of relay B (Figure 7). Contact A2 closes current to the coil of line short supervising relay 10. (During normal operation relay 10 does not become fully energized due to the slow to operate action of the coil. The relay energizes only when contact A2 remains energized for a predetermined length of time, such as a line open or line short trouble conditions.)

S4.—At the substation, relay B deenergizes, thereby opening contacts B1 and B2. Contact B2 removes current from the coil of relay 31 and the relay 31 deenergizes, thereby opening contacts 31A and 31B. Contacts 31A and 31B remove current from the "open" and "close" disagreement relay buses. Contact B1 removes current from the operation coil 2X of rotary switch 2. Switch 2 deenergizes, opening contact 2A and 2B and advancing the wiper arm from the neutral point to point 1″ on the switch. Contacts 2C and 2D on the normal point close and contact 2E on the point 1″ opens and contact 2F on point 1″ closes. The opening of contacts 2B and 2E removes positive current from the polarizing stack Y1, line L1, polarizing stack Y and the coil of relay A.

S5.—Relay A deenergizes, opening contacts A1 and A2. Contact A1 removes current to breaker selection switch 1 and the coil 1X deenergizes, closing contacts 1A and 1B, and the wiper arm advances from the normal point to point 1′. Contacts 1C and 1D close on the normal point and contact 1E opens and contact 1F closes on point 1′. The closing of contact 1A passes positive current through polarizing stack X, over line L1, through polarizing stack X1 to the coil of relay B.

S6.—Relay B energizes, closing contacts B1 and B2. Contact B2 closes current to the slow-to-operate control relay 31. Contact B1 closes current to the operating coil 2X of switch 2 and the relay energizes, closing contacts 2A and 2B. At the central office, the rotating wiper arm on the breaker selection switch 1 remains on point 1′ and the operating coils of the rotary switch remain in the deenergized position due to the open circuit at 2E on point 1″ of rotary switch 2. At the substation, the rotating wiper arm on the breaker selection relay 2 remains on point 1″ and the operating coils of the switch remain in the energized position.

As previously described, the breaker selection switches 1 and 2 are of the rotating type. The rotating wiper arms on the switches are stepped or advanced from one point to the other only upon the deenergizing of the operating coils. The interrupter contacts 1A and 1B on rotary switch 1 are moved to the open circuit position when their respective operating coils 1X energizes, and the interrupter contacts 2A and 2B on rotary switch 2 are moved to the closed circuit position when their respective operating coils 2X energizes.

S7.—At the central office, when rotary switch 1 advanced from the normal point to point 1', the closing of contact 1D on the normal point closes current to the coil of the normal-abnormal relay 3. The relay energizes, closing contacts 3A, 3C, 3D and 3E and opening contact 3B. Contact 3A closes current to the abnormal indication lamp and the lamp is illuminated. Contact 3B removes current to the normal lamp and the lamp extinguishes. Contact 3C closes the circuit to the "trip-close" master control switch 28. Contact 3D closes the circuit from line L2 to the 210 and 270 frequency receivers. Contact 3E closes to the system trouble bell relay 9.

S8.—The open contact 1E on point 1' is shunted by closed contact 12A on the manually operated breaker selection switch 12. Contact 1F closes current to the coil of point selection control relay 4. The relay energizes and closes contacts 4A, 4B, 4C, and 4D.

S9.—Contact 4A closes the circuit from the "open" lamp control bus to coil 6A of the lamp control relay. Contact 4B closes the circuit from the "close" lamp control bus to coil 6B of the lamp control relay 6. Lamp relay 6 is a mechanically positioned relay and is operated by two coils. The coil marked 6A operates the contacts to the energized position and the coil marked 6B operates the contacts to the deenergized position.

S10.—Contact 4C closes current to the amber point selection lamp 17C on the four lamp escutcheon 17. Contact 4D closes current to the coil of the disagreement lamp and audible alarm relay 5. The relay energizes through the closed contact 12B on the manually operated breaker selection switch 12, closing contacts 5A, 5B and 5C.

S11.—Contact 5A seals the coil energized through the closed contact on the disagreement lamp and audible alarm reset push button 27. Contact 5B closes current to the audible alarm bell 14 and the bell sounds. Contact 5C closes current to the disagreement lamp 17D on the four lamp escutcheon 17 and the lamp illuminates.

S12.—At the substation when rotary switch 2 advanced from the normal point to point 1'', contact 2C closed across start buses #1 and #2. Contact 2D closed current to the normal-abnormal relay 30. The relay energizes, closing contacts 30A, 30B and 30D and opening contact 30C The opening of contact 30C extinguishes the normal lamp 40, and the closing of contact 30B illuminates the abnormal lamp 41. Contact 30A closes the current to the "open-close" common bus of the 210 and 270 cycle oscillators.

S13.—On point 1'' of relay 2, the opening of contact 2E removed positive current from polarizing stack Y1, line L1, polarizing stack Y and relay A. The closing of contact 2F closes current to the coil of the point selection relay 32. The relay energizes, closing contacts 32A, 32B, 32C, 32D and 32E. Contact 32A closes the circuit from the "open" disagreement relay bus to coil 34A of the breaker disagreement relay 34. Contact 32B closes the circuit from the "close" disagreement relay bus to coil 34B of the breaker disagreement relay 34.

S14.—Contact 32C closes current from the "open-close" common bus, through the closed contact 33B on the breaker supervisory relay 33 to the "open" bus plate circuit of the 210 cycle oscillator. 210 cycle current is passed over lines L1 and L2 to the 210 cycle receiver at the central office.

S15.—At the central office the frequency operated relay 210 energizes, closing contacts 210A. The closing of contacts 210A closes current to the "open" lamp control bus. The slow-to-operate "open" lamp control relay 7 energizes, closing contacts 7A, 7B and opening contact 7C. Contact 7A closes current through the closed contact 3E to the system trouble bell relay 9. Relay 9 is an oil dash pot time delay operating relay and does not energize on a normal signal operation.

S16.—The function of contacts 7C and 8C on the "open" and "close" lamp control relays 7 and 8 is to open the coil circuit to the synchronizing relay A when the manual switch 78 has been operated to the open position. The opening of the circuit to the coil of relay A holds both the breaker selection rotary switches 1 and 2 on the points selected until the signal is acknowledged and switch 78 manually closed to reclose the circuit to the coil of relay A. Normally the switch 78 is closed for automatic operation.

S17.—The closing of contact 7B closes current to the "open" lamp relay bus. Coil 6A of the lamp relay 6 energizes, closing contact 6D and opening contact 6C. Contact 6D closes current to the green breaker "open" lamp 17B on the four lamp escutcheon 17 and the lamp illuminates. Contact 6C removes current from the red breaker "closed" lamp 17A and the lamp extinguishes. The contacts of lamp relay 6 mechanically lock in the energized position.

S18.—At the substation, the slow-to-operate relay 31 energizes closing contacts 31A and 31B. Relay 31 is adjusted to operate after relays 7 and 8 at the central office have operated. Contact 31A closes current to the "open" disagreement relay bus, and contact 31B closes current to the "close" disagreement relay bus.

S19.—Current is fed to coil 34A on the mechanically positioned breaker disagreement relay 34 through closed contacts 32A, 33E, and 34E. The coil energizes, thereby closing contacts 34C, 34D, 34F, 34J and opening contacts 34E, 34G and 34H. The opening of contact 34E removes current from coil 34A, but the contacts remain mechanically held in the above described positions. Contact 34C closes current to the coil of the breaker supervisory relay 33. Contact 34D closes the circuit from coil 34B to the open contact 33D. Contact 34F closes the circuit from start bus #2 to the open contact 33F. Contact 34J closes the circuit from restore bus #1 through closed contact 33J to start bus #2, this establishing a shunt across rotary switch contact 2E. Contact 34G opens the circuit across start bus #1 and start bus #2 and removes the shunt across contacts 2C on the normal point on relay 2. Contact 34H opens the circuit from restore bus #1 to the open contact 33H. The contacts on relay 34 are mechanically locked in the energized position and will remain in the energized position until coil 34B is energized on a "breaker closed" signal.

*S20.*—The shunting of contact 2E passes positive current through polarizing stack Y1, over line L1, through polarizing stack Y to the coil of relay A at the central office.

*S21.*—Relay A energizes closing contacts A1 and A2. Contact A1 closes current to coil 1X of the breaker selection switch 1 and the relay energizes, opening contacts 1A and 1B. Contact 1B removes current to relay 7 and the relay deenergizes, opening contacts 7A, 7B and closing contact 7C. Contact 7A removes current to the system trouble bell relay 9 and contact 7B removes current from the "open" lamp relay bus. Coil 6A of the lamp relay 6 deenergizes, whereupon the contacts on relay 6 are mechanically locked in the energized position, and will remain in the energized position until coil 6B is energized on a "breaker closed" signal.

*S22.*—The opening of contact 1A removes positive current from polarizing stack X, line L1, polarizing stack X1 and coil B of relay B.

*S23.*—Relay B deenergizes, opening contacts B1 and B2. Contact B1 removes current from the coil of switch 2 and the coil deenergizes, advancing the wiper arm to point 2. Contact B2 removes current to relay 31 and the relay deenergizes, opening contacts 31A and 31B and removing current to the "open" and "close" disagreement relay buses. The openning of contact 2B removes positive current from polarizing stack Y1, line L1, polarizing stack Y and coil A of relay A.

*S24.*—Relay A deenergizes, opening contacts A1 and A2. The opening of contact A1 removes current from coil 1X of switch 1 and said switch deenergizes, advancing the arm to point 2, and also causing contacts 1A and 1B to close. The closing of contact 1A passes positive current through polarizing stack X, over line L1, through polarizing stack X, to the coil of relay B.

*S25.*—Relay B energizes, closing contacts B1 and B2. The closing of contact B1 closes current to the coil of switch 2 and the switch energizes, closing contacts 2A and 2B. The closing of contact 2A passes positive current through polarizing stack Y1, over line L1, through polarizing stack Y to the coil of relay A. This step-by-step procedure of relays A and B and rotary switches 1 and 2 will continue until the rotating wiper arms on both switches have reached the normal point and contact 2C is opened, removing positive current from polarizing stack Y1, line L1, polarizing stack Y and the coil of relay A.

*S26.*—When the rotating arm on switch 2 at the substation advanced beyond point 1″, this caused contact 2E to close and caused contact 2F to open. The opening of contact 2F removed current from the coil of the point selection relay 32. Thereupon the relay deenergized and opened contacts 32A, 32B, 32C, 32D, and 32E.

*S27.*—Contact 32A opened the circuit from the "open" disagreement bus to coil 34A of relay 34, and contact 32B opened the circuit from the "close" disagreement bus to coil 34B of relay 34.

*S28.*—Contact 32C opened the circuit to the 210 cycle oscillator through closed contact 33B on the breaker supervisory relay 33. The opening of the circuit to the 210 cycle oscillator removed the 210 cycle frequency from lines L1 and L2 and from the 210 cycle receiver at the central office. The 210 cycle control relay 210 thereupon deenergized and opened contact 210A. The opening of contact 210A removes current from the "open" lamp control bus.

*S29.*—When the rotating arm on switch 1 at the central office advanced beyond point 1′ this caused contact 1E to close and caused contact 1F to open. The opening of contact 1F removed current from the point selection relay 4. Thereupon, the relay deenergized and opened contacts 4A, 4B, 4C and 4D.

*S30.*—Contact 4A opened the circuit from the "open" lamp control bus to coil 6A of lamp relay 6. Contact 4B opened the circuit from the "close" lamp control bus to coil 6B of lamp relay 6. Contact 4C removed current from the point selection lamp 17C on the four lamp escutcheon 17, and the lamp extinguished. Contact 4D opened the circuit to the coil of relay 5, but the relay remains energized through the sealing contact 5A and contacts 27A on the disagreement lamp and audible alarm reset push button 27.

*S31.*—At the substation, when the rotating wiper arm on rotary switch 2 reached the normal point, both contacts 2C and 2D were opened. The opening of contact 2C removed positive current from polarizing stack Y1, line L1, polarizing stack Y and relay A. The opening of contact 2D removed current from the normal-abnormal relay 30 and the relay deenergized, opening contacts 30A, 30B, 30D and closing contact 30C. Contact 30A removed current from the "open-close" common bus. Contact 30B removed current from the abnormal lamp 41 and the lamp extinguished. Contact 30C closed current to the normal lamp 40 and the lamp illuminated. Contact 30D opened the circuit from line L2 to the 90 and 150 cycle frequency receivers.

*S32.*—At the central office, when the rotating wiper arm on rotary switch 1 reached the normal point, both contacts 1C and 1D were opened. Contact 1D removed current from the normal-abnormal relay 3, and the relay deenergized, opening contacts 3A, 3C, 3D, 3E, and closing contact 3B. Contact 3A removed current from the abnormal lamp 21 and the lamp extinguished. Contact 3B closed current to the normal lamp 20 and the lamp illuminated. Contact 3C removed current from the master control "trip-close" switch 28. Contact 3D opened the circuit from line L2 to the 210 and 270 cycle frequency receivers.

*S33.*—Upon the return of the rotating wiper arms to their respective normal points on rotary switches 1 and 2, the system comes to rest.

*S34.*—To silence the audible alarm bell 14 and extinguish the disagreement lamp 17D on the four lamp escutcheon, the disagreement lamp and audible alarm reset push button 27 is momentarily manually operated. The opening of contact 27A removes current from the coil of relay 5 and the relay deenergizes, opening contacts 5A, 5B, and 5C. The opening of contact 5A removes the sealing circuit to coil 5. Contact 5B removes current from the alarm bell bus and the audible alarm bell 14 is silenced. Contact 5C removes current from the disagreement lamp 17D and the lamp is extinguished. This operation restores the system to normal.

If it is desired that a printed record be made at central office of the supervisory indications and other signals that are transmitted to central office from the one or more substations, such may be accomplished in various ways, such as by providing the lamp relay 6 at central office with additional contacts 6E and 6F suitably connected with an appropriate recorder to control the latter.

*Remote control operation and supervisory indication of remote control operation*

Upon the indication of an open breaker by illumination of the green lamp on the lamp escutcheon, or by a printed record, or both, it is assumed that it is desirable to close the breaker immediately by remote control.

*Operation C1.*—The load dispatcher first operates the individual breaker selection switch 12 for the breaker that has just operated. (A selection switch is necessary for each remote control point.) The operation of the switch opens contacts 12A and 12B. Contact 12B opens the circuit to the disagreement lamp and audible alarm relay 5 so that this relay will not energize and sound the audible alarm during remote control operation. The opening of contact 12A removes the shunt across contact 1E of the breaker selection switch 1.

*C2.*—The load dispatcher then momentarily operates the selection start switch 23, opening the circuit from relay A to the polarizing stack Y and closing the circuit from relay A to conductor C2.

*C3.*—Relay A energizes, closing contacts A1 and A2. The closing of contact A1 energizes the operating coil 1X of breaker selection switch 1. The energizing of coil 1X opens contacts 1A and 1B. Contact 1B opens the circuit to the "open" and "close" control relays 7 and 8. The opening of contact 1A removes positive current from polarizing stack X, line L1, polarizing stack X1 and the coil of relay B. Contact A2 closes current to the coil of line trouble supervising relay 10. (During normal operation relay 10 does not become fully energized due to the slow-to-operate action of the coil. The relay energizes only when contact A2 remains energized for a predetermined length of time, such as a line open or a line short condition.)

*C4.*—At the substation, relay B deenergizes and opens contacts B1 and B2. Contact B2 removes current from the coil of relay 31, and relay 31 deenergizes, opening contacts 31A and 31B. Contacts 31A and 31B remove current from the "open" and "close" disagreement relay buses. Contact B1 removes current from the operating coil 2X of rotary switch 2. Switch 2 deenergizes, opening contacts 2A and 2B and advancing the wiper arm from the neutral point to point 1″ on the switch. Contacts 2C and 2D on the normal point close, and contact 2E on the point 1″ opens and contact 2F on point 1″ closes. The opening of contact 2B removes positive current from the polarizing stack Y1, line L1, polarizing stack Y.

*C5.*—Upon the release of selection start switch 23, relay A deenergizes, opening contacts A1 and A2. Contact A1 removes current to breaker selection switch 1 and the coil deenergizes, closing contacts 1A and 1B, and causing the wiper arm to advance from the normal point to point 1′. Contacts 1C and 1D close on the normal point, and contact 1E opens and contact 1F closes on point 1′. The closing of contact 1A passes positive current through polarizing stack X, over line L1, through polarizing stack X1 to the coil of relay B.

*C6.*—Relay B energizes and closes contacts B1 and B2. Contact B2 closes current to the slow-to-operate control relay 31. Contact B1 closes current to the operating coil of relay 2, the relay energizes, closing contacts 2A and 2B.

At the central office, when the breaker selection 12 was operated, contact 12A removed the shunt from contact 1E on point 1′ of breaker selection switch 1, and when the wiper arm on switch 1 advanced to point 1′ the circuit to the coil of relay A was opened. Therefore, switch 1 will remain deenergized with its wiper arm on point 1′, and switch 2 will remain energized with its wiper arm point 1″. The two rotary switches will remain in this position until the manually operated breaker selection switch 12 is restored to its normal position.

*C7.*—At the central office when rotary switch 1 advanced from the normal point to point 1′, the closing of contact 1D on the normal point closed current to the coil of the normal-abnormal relay 3. The relay thereupon energizes, closing contacts 3A, 3C, 3D, and 3E and opening contact 3B. Contact 3A closes current to the abnormal indication lamp and the lamp is illuminated. Contact 3B removes current from the normal lamp and the lamp extinguishes. Contact 3C closes the circuit to the "trip-close" master control switch 28, and contact 3D closes the circuit from line L2 to the 210 and 270 cycle frequency receivers. Contact 3E closes to the system trouble bell relay 9.

*C8.*—Contact 1E on point 1′ opened the circuit to the coil of relay A. Contact 1F closes current to the coil of point selection control relay 4. The relay energizes and closes contacts 4A, 4B, 4C, and 4D.

*C9.*—Contact 4A closes the circuit from the "open" lamp control bus to coil 6A of the lamp control relay. Contact 4B closes the circuit from the "close" lamp control bus to coil 6B of the lamp control relay. (As previously described, lamp relay 6 is a mechanically positioned relay and is operated by two coils. The coil 6A operates the contacts to the energized position, and the coil 6B operates the contacts to the deenergized position.)

*C10.*—Contact 4C closes current to the amber point selection lamp 17C on the four lamp escutcheon. Contact 4D closes current to the coil of the disagreement lamp and audible alarm relay 5.

*C11.*—The circuit to the audible alarm relay 5 is opened by contact 12B on the manually operated breaker switch 12, when switch 12 is operated for a remote control operation.

*C12.*—At the substation when rotary switch 2 advanced from the normal point to point 1″, contact 2C moved to closed position across start buses #1 and #2. Contact 2D closed current to the normal-abnormal relay 30. The relay energizes, closing contacts 30A, 30B and 30D and opening contact 30O. The opening of contact 30C extinguishes the normal lamp 40 and the closing of contact 30B illuminates the abnormal lamp 41. Contact 30A closes the circuit to the "open-close" common bus of the 210 and 270 cycle oscillators. Contact 30D closes the circuit from line L2 to the 90 and 150 cycle receivers.

*C13.*—On point 1″ of rotary switch 2, the opening of contact 2E removed positive current from polarizing stack Y1, line L1, polarizing stack Y and relay A. The closing of contact 2F closes current to the coil of the point selection relay 32. The relay energizes, closing contacts 32A, 32B, 32C, 32D and 32E. Contact 32A closes the circuit from the "open" disagreement relay bus to coil 34A of the breaker disagreement relay 34.

Contact 32B closes the circuit from the "close" disagreement relay bus to coil 34B of the breaker disagreement relay 34.

*C14.*—Contact 32C closes current from the "open close" common bus, through the closed contact 33B on the breaker supervisory relay 33 to the "open" bus plate circuit of the 210 cycle oscillator. 210 cycle current is passed over lines L1 and L2 to the 210 cycle receiver at the central office.

*C15.*—At the central office the frequency operated relay 210X energizes, closing contact 210A. The closing of contact 210A closes current to the "open" lamp control bus. The slow-to-operate "open" lamp control relay 7 energizes, closing contacts 7A, 7B and opening contact 7C. Contact 7A closes current through the closed contact 3E to the system trouble bell relay 9. Relay 9 is an oil dash pot time delay operating relay and is preadjusted so that it does not energize on normal signal operations.

*C16.*—The function of contacts 7C and 8C on the "open" and "close" lamp control relays 7 and 8 is to open the coil circuit to the synchronizing relay A. The opening of the circuit to the coil of relay A holds both the breaker selection switches 1 and 2 on the point selected until the signal is acknowledged and the switch 78 manually closed to reclose the circuit to the coil of relay A. Normally switch 78 is closed for automatic operation.

*C17.*—The closing of contact 7B closes current to the "open" lamp relay bus. Coil 6A of lamp relay 6 energizes but the contacts of relay 6 had operated and mechanically locked in the energized position as previously described in operation "S17" for the breaker open signal.

*C18.*—At the substation, the slow-to-operate relay 31 energizes, closing contacts 31A and 31B. Contact 31A closes current to the "open" disagreement relay bus, and contact 31B closes current to the "close" disagreement relay bus. (Relay 31 is adjusted to operate after relays 7 and 8 at the central office have operated.)

*C19.*—The contacts on breaker disagreement relay 34 are locked in the energized position as previously described in operation for a breaker open signal.

*C20.*—At the central office, the load dispatcher then operates the master control switch 28 to the "close" position. The 90 cycle oscillator energizes, transmitting 90 cycle current over lines L1 and L2 to the 90 cycle receiver at the substation.

*C21.*—The 90 cycle receiver energizes the 90 cycle frequency controlled breaker "close" relay 90X. Contact 90A closes current through closed contact 32D to the coil of the auxiliary breaker close relay 35.

*C22.*—Relay 35 energizes, closing contact 35A. Contact 35A closes current to the close coil of the oil circuit breaker OCB. The breaker closes. The closing of the oil circuit breaker closes the supervising contact OCB—1.

*C23.*—The closing of the supervising contact OCB—1 on the breaker, closes current to the breaker supervising relay coil 33X. The relay energizes, closing contacts 33A, 33C, 33D, 33F and 33H and opening contacts 33B, 33E, 33G, and 33J. Contact 33A locks current to coil 33, contact 33B removes current from the oscillator "open" bus circuit and the 210 cycle oscillator deenergizes. 210 cycle current is removed from lines L1 and L2 and the 210 cycle receiver at the central office. The frequency operated breaker "open" relay 210X at the central office deenergizes, opening contact 210A. Contact 210A removes current from the "open" lamp control bus. The "open" lamp control relay 7 deenergizes, opening contacts 7A and 7B, and closing contact 7C. Contact 7A removes current to relay 9, contact 7B removes current to coil 6A of relay 6, and contact 7C shunts manual switch 78.

*C24.*—At the substation contact 33C closes current to the oscillator "close" bus circuit and to the 270 cycle oscillator. The 270 cycle oscillator impresses 270 cycle current over lines L1 and L2 to the 270 cycle receiver at the central office.

*C25.*—At the central office, the frequency operated breaker close relay 270X energizes, closing contact 270A. Contact 270A closes current to the "close" lamp control bus. Relay 8 energizes, closing contacts 8A and 8B and opening contact 8C. Contact 8A closes current to relay 9. Contact 8C opens the shunt on manual switch 78. Contact 8B closes current to the 6B coil of lamp relay 6. The coil energizes, closing contact 6C and opening contact 6D. Contact 6C closes current to the red "close" lamp 17A on the 4 lamp escutcheon 17 and the lamp illuminates. Contact 6D opens and extinguishes the green lamp 17B. The master control switch 28 is released, deenergizing the 270 cycle oscillator.

*C26.*—At the substation, contact 33D closes current through closed contact 34D to coil 34B of the breaker disagreement relay 34. The coil energizes, opening contacts 34C, 34D, 34F, and 34J and closing contacts 34E, 34G and 34H. Contact 34C removes the shunt on contact 33A. Contact 34D removes current from coil 34B and the coil deenergizes. However, the contacts on relay 34 remain mechanically locked in the deenergized position. Contact 34E closes the circuit from open contact 33E to coil 34A. Contact 34F opens the circuit between start bus #2 and closed contact 33F. Contact 34G closes the circuit from start bus #2 to the open contact 33G. Contact 34H closes the circuit from restore bus #1 through closed contact 33H to start bus #2. Closing the circuit across restore bus #1 and start bus #2 shunts contact 2E on point 1″ of stepping switch 2.

*C27.*—At the central office the load dispatcher restores the breaker selection switch 12 back to normal, closing contacts 12A and 12B. Contact 12A shunts contact 1E on point 1′ of rotary stepping switch 1.

*C28.*—The shunting of contact 1E closes current to synchronizing relay A. Relay A energizes, closing contacts A1 and A2. Contact A1 closes current to coil 1X of the breaker selection switch 1 and the switch energizes, opening interrupter contacts 1A and 1B. Contact 1B removes current from "close" lamp control relay 8 and the relay deenergizes, opening contacts 8A, 8B and closing contact 8C. Contact 8A removes current from the system trouble bell relay 9, and contact 8B removes current from the "close" lamp relay bus. Coil 6B of the lamp relay 6 deenergizes, but the contacts on relay 6 are mechanically locked in the deenergized position to which they have been moved by the energization of coil 63, and said contacts will remain in this deenergized position until the other coil 6A is energized on a "breaker open" signal.

*C29.*—The opening of interrupter contact 1A removes positive current from polarizing stack X, line L1, polarizing stack X1, and coil BX of substation synchronizing relay B.

*C30.*—Synchronizing relay B deenergizes, opening contacts B1 and B2. Contact B1 removes current from the coil of selection switch 2 and the coil deenergizes, opening interrupter contact 2B and advancing the wiper arm to point 2″. Contact B2 removes current from relay 31 and the relay deenergizes, opening contacts 31A and 31B, and removing current from the "open" and "close" disagreement relay buses. The opening of interrupter contact 2B removes positive current from polarizing stack Y1, line L1, polarizing stack Y and coil AX of central office synchronizing relay A.

*C31.*—Synchronizing relay A deenergizes, opening contacts A1 and A2. Contact A1 removes current from coil 1X of selection switch 1 and the switch deenergizes, closing interrupter contacts 1A and 1B and advancing the wiper arm from point 1′ to point 2′. The closing of interrupter contact 1A passes positive current through polarizing stack X, over line L1, through polarizing stack X1, to the coil of substation synchronizing relay B.

*C32.*—Synchronizing relay B energizes, closing contacts B1 and B2. The closing of contact B1 closes current to the coil of selection switch 2, whereupon the switch energizes and closes interrupter contacts 2A and 2B. The closing of interrupter contact 2B passes positive current through polarizing stack Y1, over line L1, through polarizing stack Y to the coil of synchronizing relay A. This step by step procedure of synchronizing relays A and B and selection switches 1 and 2 will continue until the rotating wiper arms on both rotary switches have reached their respective normal points and contact 2C is opened, removing positive current from polarizing stack Y1, line L1, polarizing stack Y and coil AX of synchronizing relay A.

*C33.*—The rotating wiper arm on selection switch 2 upon leaving point 1′, closed contact 2E and opened contact 2F. The opening of contact 2F removed current from the coil of the point selection relay 32. The relay deenergizes, opening contacts 32A, 32B, 32C, 32D, and 32E.

*C34.*—Contact 32A opened the circuit from the "open" disagreement relay bus to coil 34A of relay 34, and contact 32B opened the circuit from the "close" disagreement relay bus to coil 34B of relay 34.

*C35.*—Contact 32C opened the circuit to the 270 cycle oscillator through closed contact 33B on the breaker supervisory relay 33. The opening of the circuit to the 270 cycle oscillator removed the 270 cycle frequency from lines L1 and L2 and from the 270 cycle receiver at the central office. The 270 cycle control relay 270X deenergizes, opening contacts 270A. The opening of contact 270A removed positive current from the "close" lamp control bus.

*C36.*—The rotating arm on selection switch 1 at the central office, upon leaving point 1′, closed contact 1E and opened contact 1F. The opening of contact 1F removed current from the point selection relay 4. The relay deenergizes, opening contacts 4A, 4B, 4C and 4D.

*C37.*—Contact 4A opened the circuit from the "open" lamp control bus to coil 6A of lamp relay 6. Contact 4B opened the circuit from the "close" lamp control bus to coil 6B of lamp relay 6. Contact 4C removed current from the point selection lamp 17C on the four lamp escutcheon 17, and the lamp extinguished. Contact 4D opened the circuit to the coil of relay 5.

*C38.*—At the substation, when the rotating wiper arm on selection switch 2 reached the normal point, contacts 2C and 2D opened. The opening of contact 2C removed positive current from polarizing stack Y1, line L1, polarizing stack Y and synchronizing relay A. Contact 2D removed current from the normal-abnormal relay 30 and the relay deenergized, opening contacts 30A, 30B, 30D and closing contact 30C. Contact 30A removed current from the "open-close" common bus. Contact 30B removed current from the abnormal lamp 41 and the lamp extinguished. Contact 30C closed current to the normal lamp 40 and the lamp illuminated. Contact 30D opened the circuit from line L2 to the 90 and 150 cycle frequency receivers.

*C39.*—At the central office when the rotating wiper arm on selection switch 1 reached the normal point, contacts 1C and 1D opened. Contact 1D removed current from the normal-abnormal relay 3 and the relay deenergized, opening contacts 3A, 3C, 3D, 3E, and closing contact 3B. Contact 3A removed current from the abnormal lamp 21 and the lamp extinguished. Contact 3B closed current to the normal lamp 20 and the lamp illuminated. Contact 3C removed current from the master "trip-close" switch 28. Contact 3D opened the circuit from line L2 to the 210 and 270 cycle frequency receivers. Contact 3E opened the circuit to system trouble relay 9.

*C40.*—Upon the return of the rotating wiper arms of the selection switches 1 and 2 to their respective normal points, the system comes to rest.

*Line supervising relays*

Referring first to accidental shorts between lines L1 and L2, the line trouble supervising relay 10 is a slow-to-operate relay and is preadjusted so that the relay will not energize on normal supervisory or control operations. The relay is normally deenergized.

If lines L1 and L2 become shorted together, central office relay A and rotary switch 1 energize, and substation relay B and rotary switch 2 deenergize. The deenergizing of substation selection switch 2 advances the wiper arm to point 1″. Central office selection switch 1 remains on the normal point.

The closing of contact A2 energizes the slow-to-operate line trouble supervising relay 10. The closing of contact 10A sounds the line trouble bell 13, and the closing of contact 10B illuminates the line trouble indicating lamp 22.

When the short on lines L1 and L2 is removed, synchronizing relay A deenergizes, opening contacts A1 and A2. Contact A2 removes current from the line trouble supervising relay 10 and the relay deenergizes, opening contacts 10A and 10B. Contact 10A silences the line trouble bell, and contact 10B extinguishes the line trouble indicating lamp 22.

Contact A1 removes current to selection switch 1 and the switch deenergizes, closing central office interrupter contact 1A and advancing the wiper arm to point 1′. The closing of interrupter contact 1A closes current to substation synchronizing relay B and the relay energizes. Contact B1 closes current to substation selection switch 2 and the switch energizes, closing substation interrupter contact 2B. Interrupter contact 2B closes current to synchronizing relay A. As previously described in the system operation, synchronizing relays A and B, and selection switches 1 and 2 operate and advance step-by-step until they reach their normal points.

Referring now to accidental open line conditions, the line open supervising relay 11 is normally energized with contact 11A closed and contacts 11B and 11C open. If line L1 or L2 become open, synchronizing relay B, selection relay 2 and supervising relay 11 will deenergize. Selection switch 2 thereupon advances the wiper arm to point 1'', contacts 11B and 11C of relay 11 close, and contact 11A opens. Contact 11B illuminates the open line supervisory indicating lamp 24. Contact 11A opens the circuit from polarizing stack Y to coil AX of synchronizing relay A. Contact 11C closes from line L2 to coil AX of synchronizing relay A.

Synchronizing relay A energizes, closing contacts A1 and A2. The closing of contact A1 closes current to rotary selection switch 1 and the switch energizes, opening interrupter contact 1A. The closing of contact A2 energizes the slow-to-operate line trouble supervising relay 10. The closing of relay contact 10A sounds the line trouble bell 13, and the closing of relay contact 10B illuminates the line trouble supervising lamp 22.

Line open test is made by the manual operation of the line open test switch 43. When line L1 or L2 are again closed, the voltmeter VM will show a reading when switch 43 is operated. If the voltmeter shows a reading indicating that the line has been restored to normal, then the line open restore switch 42 is momentarily operated manually, opening the circuit from line L2 to coil AX of synchronizing relay A. The opening of switch 42 removes current from synchronizing relay A and the relay deenergizes, opening contacts A1 and A2.

The opening of contact A1 deenergizes rotary selection switch 1, closing interrupter contact 1A and advancing the switch arm to point 1'. The opening of contact A2 on synchronizing relay A deenergizes supervising relay 10, silencing the system trouble bell 13 and extinguishing the line trouble indicating lamp 22.

The closing of interrupter contact 1A closes current to line L1, and hence synchronizing relay B, selection relay 2 and supervising relay 11 energize. The closing of contact 11A on supervising relay 11 closes the circuit from line L1 to coil AX of synchronizing relay A. Contact 11C opens the circuit from line L2 to the coil of synchronizing relay A. The opening of contact 11B extinguishes the open line supervising lamp 24.

The energizing of rotary selection switch 2 closes interrupter contact 2B. Contact 2B closes current to synchronizing relay A and the relay energizes, closing contacts A1 and A2. Contact A1 closes current to rotary selection switch 1 and the relay energizes, opening interrupter contact 1A.

Synchronizing relays A and B and rotary selection switches 1 and 2 will operate and advance step-by-step until the rotary arms on selection switches 1 and 2 reach their normal positions.

With reference to ground test, ground indication on line L1 or L2 is obtained by the manual test switch 29 through a voltmeter VM' to ground.

In summarizing certain of the operating characteristics and advantages of the system, it will be noted that the rotary switches 1 and 2 will effectively hold their synchronized relation on the same selected point contacts while the supervisory signals are being transmitted from the substation to the central station and/or while the control signals are being transmitted from the central station to the substation. Also, after a supervisory signal has been transmitted from a particular piece of equipment at the substation to the central station, the two rotary switches 1 and 2 will stand in their synchronized positions on predetermined point contacts corresponding to that piece of equipment until a control signal has been transmitted back from the central station to that piece of equipment at the substation, or until the system has been restored to normal. Similarly, after a control signal has been transmitted from the central station to a piece of equipment at the substation, these rotary switches will remain synchronized for the automatic transmission of a supervisory signal back to the central station to show that said control signal has effected the desired control operation.

It should also be noted that the synchronized relation will be maintained in the event of any fault or trouble condition arising on the system, such as open line, shorted line, mechanical or electrical failure, system power failure, grounded line, etc. Furthermore, the synchronized relation will be maintained irrespective of whether the fault arises while the system is standing idle, or while the system is in a supervisory operation or a control operation. This synchronized relation is maintained because of the fact that each rotary selection switch 1 or 2 can only energize upon receiving a positive component of the alternating current transmitted from the other rotary selection switch, and the back and forth transmission of these positive components is directly dependent upon the switching operations of the interrupter contacts 1A and 2B which are mechanically tied to the stepping armatures of the selection switches so that contact 1A can only close when its associated armature is stepping switch 1 forwardly, and so that contact 2B can only close when its associated armature is retracting to engage the next succeeding ratchet tooth. This electro-mechanical synchronization will prevent either of the rotary selection switches from operating or continuing to operate in the event that the other rotary selection switch is unable to operate or ceases operating as a result of the occurrence of the line faults or trouble conditions mentioned above. This is also true if mechanical or electrical faults should prevent the rotary arm of the selection switch from advancing, or if the stepping armature should be prevented from oscillating.

A decided simplification of electrical connections and of structure follows from the fact that each rotary selection switch 1 and 2 is operative from either end of the system, i. e., each selection switch functions alternatively as a transmitter and as a receiver.

The present invention can also be used as an indicating system, such as a remote metering system or the like.

As previously remarked, in lieu of a 60 cycle alternating current as the main synchronizing current operative between stations, I may employ direct currents which are pulsated or varied, periodically or continuously. Moreover, the superposed signalling currents represented by the 90 cycle, 150 cycle, 210 cycle and 270 cycle alternating currents might be substituted by direct currents of different voltages operating on marginal relays, etc., or by direct currents of different polarities operating on polarized relays, etc.

The system also avoids the possibility of interference between control signals originating at the central station and supervisory signals originating at the substation. For example, if while the attendant at the central station is going through the operations of transmitting a control signal, such as to open circuit breaker #20, a supervisory condition should arise at the substation, such as the opening of circuit breaker #10, this supervisory condition will be stored at the substation by means of the coaction of breaker supervisory relay 33 and its associated breaker disagreement relay 34. The storing operation occurs as the result of the operation of relay 33 which is normally electrically self-locking and which is arranged to be restored only upon the operation of relay 34. Relay 34, being a mechanically positioned relay, is only operated after the particular point affected has been selected by the rotary switch 2. Such storing of signals is required not only because control operations might be in effect at the moment, but also because more than one supervisory condition might occur at or near the same instant of time.

While I have illustrated and described what I regard to be the preferred embodiments of my invention, nevertheless it will be understood that such are merely exemplary and that numerous modifications and rearrangements may be made therein without departing from the essence of the invention.

I claim:

1. In an electrical system, the combination of a central station and a substation, a pair of line conductors L1 and L2 connecting said stations, a source of alternating current supply having unilateral conductivity over conductor L1 and bilateral conductivity over conductor L2, a pair of branch circuits at said central station connecting one side of said source of alternating current supply with one end of conductor L1, a pilot relay A and a polarizing stack Y in one of said branch circuits, an interrupter contact 1A and a polarizing stack X in the other of said branch circuits, means for causing interrupter contact 1A to respond to pilot relay A, a pair of branch circuits at said substation connecting conductor L2 with the other end of conductor L1, a pilot relay B and a polarizing stack X1 in one of said latter branches, an interrupter contact 2B and a polarizing stack Y1 in the other of said latter branches, and means for causing interrupter contact 2B to respond to pilot relay B, polarizing stacks X and X1 being conductive in one direction, and polarizing stacks Y and Y1 being conductive in the other direction.

2. In an electrical system, the combination of a central station and a substation, a pair of line conductors L1 and L2 connecting said stations, a source of alternating current supply adapted to be impressed on said line conductors, a pair of branch circuits at said central station connecting one side of said source of alternating current supply with one end of conductor L1, a pilot relay A and a polarizing stack Y in one of said branch circuits, an interrupter contact 1A and a polarizing stack X in the other of said branch circuits, means for causing interrupter contact 1A to respond to pilot relay A, a pair of branch circuits at said substation connecting conductor L2 with the other end of conductor L1, a pilot relay B and a polarizing stack X1 in one of said latter branches, an interrupter contact 2B and a polarizing stack Y1 in the other of said latter branches, and means for causing interrupter contact 2B to respond to pilot relay B, polarizing stacks X and X1 being conductive in one direction and polarizing stacks Y and Y1 being conductive in the other direction whereby said source of alternating current supply has unilateral conductivity over conductor L1 and bilateral conductivity over conductor L2.

3. In an electrical system, the combination of a central station and a substation, a pair of line conductors L1 and L2 connecting said stations, a source of alternating current supply adapted to impress alternating current upon said line conductors, a pair of branch circuits at said central station connecting one side of said source of alternating current supply with one end of conductor L1, a pilot relay A and a polarizing stack Y in one of said branch circuits, an interrupter contact 1A and a polarizing stack X in the other of said branch circuits, a first rotary switch at said central station responsive to said pilot relay A, means coacting with said rotary switch for actuating said interrupter contact 1A, a pair of branch circuits at said substation connecting conductor L2 with the other end of conductor L1, a pilot relay B and a polarizing stack X1 in one of said latter branches, an interrupter contact 2B and a polarizing stack Y1 in the other of said latter branches, a second rotary switch at said substation responsive to said pilot relay B, and means coacting with said rotary switch for actuating said interrupter contact 2B, polarizing stacks X and X1 being conductive in one direction, and polarizing stacks Y and Y1 being conductive in the other direction whereby said source of alternating current supply has unilateral conductivity over conductor L1 and bilateral conductivity over conductor L2.

4. In an electrical system, the combination of a central station and a substation, a pair of line conductors L1 and L2 connecting said stations, a source of alternating current supply adapted to have connection with said line conductors, a pair of branch circuits at said central station connecting one side of said source of alternating current supply with one end of conductor L1, a synchronizing relay A and a polarizing stack Y in one of said branch circuits, an interrupter contact 1A and a polarizing stack X in the other of said branch circuits, a first rotary switch at said central station comprising an advancing electromagnet responsive to said pilot relay A, means for opening said interrupter contact when said advancing electromagnet is energized, a pair of branch circuits at said substation connecting conductor L2 with the other end of conductor L1, a synchronizing relay B and a polarizing stack X1 in one of said latter branches, an interrupter contact 2B and a polarizing stack Y1 in the other of said latter branches, a second rotary switch at said substation comprising an advancing electromagnet responsive to synchronizing relay B, and means for opening said interrupter contact 2B when said latter advancing electromagnet is deenergized, polarizing stacks X and X1 being conductive in one direction, and polarizing stacks Y and Y1 being conductive in the other direction whereby said source of alternating current supply has unilateral conductivity over conductor L1 and bilateral conductivity over conductor L2, said polarizing stacks cooperating with said synchronizing relay and said interrupter contacts for causing said two rotary switches to be actuated in mutually interdependent alternating sequence.

5. In a system of the class described, the combination of a central station, a substation, a line circuit extending between said stations, means for impressing a first alternating current on said line circuit, rectifiers in said line circuit for polarizing portions of said alternating current passing through portions of said circuit, synchronizing relays at each of said stations adapted to be energized by the polarized current flow passing through said rectifiers, rotary switches at each of said stations adapted to be energized by said synchronizing relays, interrupter contacts responsive to said rotary switches for controlling said line circuit, said interrupter contacts cooperating with said rectifiers for causing said rotary switches to be actuated in synchronism, point contacts at successive points of each of said rotary switches, a plurality of circuit breakers at said substation, breaker supervisory relays responsive to each of said breakers, substation point selection control relays for each circuit breaker and responsive to successive point contacts of said substation rotary switch, breaker disagreement relays responsive to each of said breaker supervisory relays and said point selection control relays, contacts responsive to said supervisory and disagreement relays for shunting point contacts of the substation rotary switch, a plurality of supervisory lamp groups at said central station, one for each of said circuit breakers, central station point selection control relays for each of said lamp groups and responsive to successive point contacts of said central station rotary switch, a lamp relay responsive to each of said latter point selection control relays and governing lamps in each of said lamp groups, and means for transmitting over said same line circuit that carries said first alternating current another alternating current that acts between the selected point contacts of said substation rotary switch and said central station rotary switch.

6. In a supervisory control system of the class described, the combination of a central station, a substation, a circuit for said stations comprising only two line conductors extending between said stations, a plurality of circuit breakers at said substation, a breaker close relay and a breaker trip relay associated with each circuit breaker at said substation, separate supervisory indicating means at said central station for giving supervisory indications of the conditions of the associated circuit breakers at said substation, means for continuously impressing a first alternating current of approximately standard frequency on said system, rectifiers in said system so arranged that only one predetermined half of the cycle of said first alternating current is permitted to flow over one of said line conductors in each direction, rotary breaker selection switches at each station connected with said line conductors, synchronizing relays at each station connected with said line conductors and cooperating with said rectifiers and rotary switches so as to transmit pulses of said first alternating current back and forth between said stations in alternating sequence for causing said two rotary switches to advance step-by-step substantially in synchronism, a breaker supervisory relay associated with each circuit breaker at said substation and connected with said substation rotary switch to initiate operation of said system when any one of said circuit breakers opens, means for causing said central station rotary switch to select the supervisory indicating means at said central station corresponding to the circuit breaker which has opened at the substation, a breaker-open supervisory oscillator and a breaker-closed supervisory oscillator at said substation, means for causing said breaker-open supervisory oscillator to transmit a second alternating current over said two line conductors when one of said circuit breakers opens, means for causing said breaker-closed supervisory relay to transmit a third alternating current over said two line conductors when one of said circuit breakers closes, a breaker-open supervisory receiver and a breaker-closed supervisory receiver at said central station responding to said second and third alternating currents respectively and arranged to cause operation of the supervisory indicating means selected by said rotary switches; manually operated breaker selection switches corresponding to each circuit breaker and connected with the central station rotary switch, said manually operated switches being adapted to select a desired circuit breaker for performing an opening or closing control operation, a breaker-closed control oscillator and a breaker-open control oscillator at said central station, master control switch means for selectively governing the operation of said control oscillators whereby to cause said breaker-closed control oscillator to transmit a fourth alternating current over said two line conductors when a selected circuit breaker is to be closed, and whereby to cause said breaker-open control oscillator to transmit a fifth alternating current over said two line conductors when a selected circuit breaker is to be opened, a breaker-closed control receiver at said substation responding to said fourth alternating current and operative to govern the appropriate breaker close relay for closing the selected circuit breaker, and a breaker-open control receiver at said substation responding to said fifth alternating current and operative to govern the appropriate breaker trip relay for opening the selected circuit breaker.

7. In an electrical system comprising a central station and a substation each having a rotary switch adapted to be operated in synchronized relation over a connecting circuit extending between said stations, the method of causing said rotary switches to be advanced in mutually interdependent alternating sequence which comprises impressing alternating current upon the system, and transmitting the positive alternations of said current from one station to the other over one conductor of said connecting circuit, while suppressing the transmission of negative alternations of said current from one station to the other over said same conductor.

8. In an electrical system, the combination of a plurality of stations each adapted to act as a transmitter and as a receiver, a circuit connecting said stations, means for impressing an alternating current on said system, means for suppressing the transmission of alternations of one polarity of said current over one portion of said circuit connecting said stations while permitting unsuppressed transmission of alternations of the opposite polarity of said current over said same portion of said circuit, rotary switches at said stations responding to said alternating current, and means coacting with said rotary switches and with said suppressing means for enabling either switch to act as a transmitter while compelling the other switch to act as a receiver and to move in a definitely synchronized relation therewith.

9. In a system of the class described, the combination of a plurality of stations each comprising electrically actuated apparatus, a circuit connecting said stations comprising two line conductors, a source of alternating current supply impressed on said system, rectifying means for rectifying the alternating current passing through a portion of said circuit whereby to suppress the transmission of alternations of one polarity over one of said line conductors, synchronizing relays at each of said stations adapted to be energized by current flow passing through said rectifying means, rotary switches at each of said stations adapted to be controlled by said synchronizing relays, an interrupter contact at one station adapted to open a portion of the circuit connecting said stations when the rotary switch at that station is energized, and an interrupter contact at another station adapted to close a portion of the circuit connecting said stations when the rotary switch at said latter station is energized.

10. In a supervisory control system, the combination of a central station, a substation, a circuit connecting said stations, means for impressing an alternating current on said circuit, means for suppressing the transmission of alternations of one polarity of said current over one side of said circuit between stations, rotary switches at said stations coacting with said alternating current for transmitting supervisory signals from said substation to said central station and for transmitting control signals from said central station to said substation, means effective after the initiation of a transmitting operation for making each suceeding step of advancement of the stepping switch at the receiving station dependent upon a preceding step of advancement of the stepping switch at the transmitting station, and for also making each succeeding step of advancement of the stepping switch at the transmitting station dependent upon a preceding step of advancement of the stepping switch at the receiving station, and non-interference means for storing a signal if one of said stations should attempt to transmit such signal while the other station is already transmitting a signal.

11. In an electrical system, the combination of first and second stations, a two conductor circuit connecting said stations, means for impressing an alternating current on said circuit, stepping switches and cooperating control contacts at each of said stations for transmitting the positive alternations of said alternating current back and forth between said stations over both of said conductors, means for suppressing the transmission of negative alternations of said current between stations over one of said conductors, said positive alternations enabling said first station to transmit signals to said second station and enabling said second station to transmit signals to said first station, means for making the stepping of said switches at each station mutually interdependent upon the condition of the control contacts at the other station, and means for preventing interfering transmission of signals from both of said stations.

12. In a system of the class described, the combination of a first station and a second station, a circuit connecting said stations, means for impressing an alternating current on said system, rectifying means establishing different polarized branches in said circuit, a first rotary selection switch in said first station comprising an actuating coil, an armature responsive thereto, pawl and ratchet mechanism actuated by said armature to advance said rotary switch upon the deenergization of said actuating coil, and an interrupter contact actuated by said armature, said actuating coil and said interrupter contact being interposed directly in different polarized branches of said circuit, said interrupter contact being mechanically connected to move to closed position when said armature moves through its retractive motion, and a second rotary selection switch in said second station comprising an actuating coil, an armature responsive thereto, pawl and ratchet mechanism actuated by said armature to advance said second rotary switch upon the deenergization of said latter actuating coil, and an interrupter contact actuated by said armature, said latter actuating coil and said latter interrupter contact being interposed directly in different polarized branches of said circuit, said latter interrupter contact being mechanically connected to move to closed position when said latter armature moves through its attractive movement.

13. A system such as is set forth in claim 12 wherein pilot relays A and B are interposed between said circuit and the actuating coils of said first and second rotary switches.

14. In an electrical system, the combination of a plurality of stations each adapted to act as a transmitter and as a receiver, a circuit connecting said stations, means for impressing an alternating current on said system, means for suppressing the transmission of alternations of one polarity of said current over one portion of said circuit connecting said stations while permitting unsuppressed transmission of alternations of the opposite polarity of said current over said same portion of said circuit, rotary switches at said stations responding to said alternating current, means coacting with said rotary switches and with said suppressing means for enabling either switch to act as a transmitter while compelling the other switch to act as a receiver and to move in a definitely synchronized relation therewith, and means whereby neither open circuit, short circuit, mechanical or electrical failure, system power failure, or grounded circuit will destroy such synchronized relation, but operation in such definitely synchronized relation will be resumed upon correction of such fault.

15. In an electrical system, the combination of a first station and a second station, circuit connections extending between said stations, means for impressing an alternating current on said circuit connections, a first rotary switch at said first station comprising a normally deenergized electromagnet, stepping mechanism responsive thereto adapted to impart stepping movement to said switch upon the deenergization of said electromagnet, and interrupter contacts adapted to be moved to open circuit position upon the energization of said electromagnet, a second rotary switch at said second station comprising a normally energized electromagnet, stepping mechanism responsive thereto adapted to impart stepping movement to said second switch upon the deenergization of said latter electromagnet, and interrupter contacts adapted to be moved to open circuit position upon the deenergization of said latter electromagnet, said first station interrupter contacts being operative to control the energization of said second station electromagnet over said circuit connections, said second station interrupter contacts being operative to control the energization of said first station electromagnet over said circuit connections, and rectifier means cooperating with said circuit connections whereby alternations of only one polarity of said alternating current are transmitted between said first station interrupter contacts and said second station electromagnet and between said second station interrupter contacts and said first station electromagnet.

16. In a system of the class described, the combination of a first station and a second station, a circuit connecting said stations, an electromagnet at said first station adapted to be energized by a predetermined direction of current flow between said stations, an electromagnet at said second station adapted to be energized by an opposite direction of current flow between said stations, and means for causing said two electromagnets to be energized in alternating sequence comprising contacts responsive to said first station electromagnet for controlling the energization of said second station electromagnet, and contacts responsive to said second station electromagnet for controlling the energization of said first station electromagnet.

17. In a system of the class described, the combination of a first station and a second station, a circuit connecting said stations, means for impressing an operating current on said system, an electromagnet at said first station, polarizing means cooperating therewith whereby said electromagnet is only energized by one direction of current flow between said stations, an electromagnet at said second station, polarizing means cooperating therewith whereby said latter electromagnet is only energized by an opposite direction of current flow between said stations, and means cooperating with said polarizing means for causing said two electromagnets to be energized in alternating sequence comprising contacts responsive to said first station electromagnet for controlling the energization of said second station electromagnet, and contacts responsive to said second station electromagnet for controlling the energization of said first station electromagnet.

18. In a system of the class described, the combination of a first station and a second station, a pair of line conductors connecting said stations, means for impressing an alternating current on said system, polarizing means for suppressing the transmission of negative alternations of said current over one of said line conductors while permitting unsuppressed transmission of the positive alternations of said current over said latter line conductor, an electromagnet at said first station energized only when said positive alternations are impressed on said latter line conductor, an electromagnet at said second station energized only when said positive alternations are impressed on the other of said line conductors, contacts responsive to said first station electromagnet for controlling the energization of said second station electromagnet, and contacts responsive to said second station electromagnet for controlling the energization of said first station electromagnet.

19. In a system of the class described, the combination of a first station and a second station, a circuit connecting said stations, an electromagnet at said first station adapted to be energized by a predetermined direction of current flow between said stations, an electromagnet at said second station adapted to be energized by an opposite direction of current flow between said stations, and means for causing said two electromagnets to be energized in mutually interdependent alternating sequence comprising contacts at said first station adapted to be moved to open position by the energization of the electromagnet at said first station for controlling the energization of the electromagnet at said second station, and contacts at said second station adapted to be moved to closed position by the energization of the electromagnet at said second station for controlling the energization of the electromagnet at said first station.

20. In a system of the class described, the combination of a first station and a second station, a circuit connecting said stations, means for impressing an alternating current on said system, polarizing means for restricting said alternating current to a unidirectional flow in certain portions of said system, a rotary switch at said first station, an electromagnet at said first station governing said rotary switch, a rotary switch at said second station, an electromagnet at said second station governing said latter rotary switch, and means cooperating with said polarizing means for causing said two rotary switches to be actuated in alternating sequence comprising contacts responsive to said first station electromagnet for controlling the energization of said second station electromagnet and contacts responsive to said second station electromagnet for controlling the energization of said first station electromagnet.

21. In a system of the class described, the combination of a first station and a second station, a circuit connecting said stations, means for impressing an alternating current on said system, a rotary switch at said first station, an electromagnet at said first station governing said rotary switch, polarizing means cooperating therewith whereby said electromagnet is only energized by one direction of current flow between said stations, a rotary switch at said second station, an electromagnet at said second station governing said latter rotary switch, polarizing means cooperating therewith whereby said latter electromagnet is only energized by an opposite direction of current flow between said stations, and means cooperating with said polarizing means for causing said two rotary switches to be actuated in mutually interdependent alternating sequence comprising contacts at said first station adapted to be moved to open circuit position by the energization of the electromagnet at said first station for controlling the energization of the electromagnet at said second station and contacts at said second station adapted to be moved to closed circuit position by the energization of the electromagnet at said second station for controlling the energization of the electromagnet at said first station.

22. In a system of the class described, the combination of a central station and a substation, a circuit connecting said stations, means for impressing an alternating current on said system, a rotary stepping switch at said central station, an electromagnet at said central station, means for causing the stepping switch to advance when said electromagnet is deenergized, polarizing means cooperating therewith whereby said electromagnet is only energized by one direction of current flow between said stations, a rotary stepping switch at said substation, an electromagnet at said substation, means for causing the stepping switch at said substation to advance when said latter electromagnet is deenergized, polarizing means cooperating therewith whereby said latter electromagnet is only energized by an opposite direction of current flow between said stations, and means cooperating with both of said polarizing means for causing said two stepping switches to be advanced in mutually interdependent alternating sequence comprising contacts at said central station adapted to be moved to open circuit position by the energization of the electromagnet at said central station for controlling the energization of the electromagnet at said substation and contacts at said substation adapted to be moved to closed circuit position by the energization of the electromagnet at said substation for controlling the energization of the electromagnet at said central station.

23. In a system of the class described, the combination of a central station and a substation, a circuit connecting said stations, means for impressing an alternating current on the system, a rotary stepping switch at said central station, an electromagnet at said central station, means for causing the stepping switch to advance when said electromagnet is deenergized, polarizing means cooperating therewith whereby said electromagnet is only energized when a positive alternation of the alternating current is transmitted in a direction from said substation to said central station, a rotary stepping switch at said substation, an electromagnet at said substation, means for causing the stepping switch to advance when said latter electromagnet is deenergized, polarizing means cooperating therewith whereby said latter electromagnet is only energized when a positive alternation of the alternating current is transmitted in a direction from said central station to said substation, and synchronizing means for causing said two rotary stepping switches to step alternately in sequence by handing such positive alternation back and forth between stations, said synchronizing means comprising control contacts at said central station adapted to be moved to open circuit position by the energization of the electromagnet at said central station for controlling the energization of the electromagnet at said substation, and control contacts at said substation adapted to be moved to closed circuit position by the energization of the electromagnet at said substation for controlling the energization of the electromagnet at said central station.

24. In a system of the class described, the combination of a first station and a second station, a circuit connecting said stations, means for impressing a first alternating current on said system to effect a selecting operation between stations, rectifying means for restricting said first alternating current to a unidirectional flow in certain portions of said system, selecting means comprising an electromagnet at said first station energized only by one direction of flow of said first alternating current between said stations, selecting means comprising an electromagnet at said second station energized only by an opposite direction of flow of said first alternating current between said stations, means cooperating with said rectifying means for causing the actuations of said selecting means to be mutually interdependent comprising control contacts at said first station responsive to said selecting means for controlling the energization of said second station electromagnet and control contacts at said second station responsive to said selecting means for controlling the energization of said first station electromagnet, and means for transmitting a second alternating current over said circuit independently of said rectifying means to effect a secondary operation between said stations.

25. In a system of the class described, the combination of a first station and a second station, a circuit connecting said stations, means for impressing an alternating current on said circuit, selecting means at said first station comprising an electromagnet, rectifying means arranged whereby said electromagnet can only be energized by alternations of one polarity of said current transmitted in a predetermined direction between stations, selecting means at said second station comprising an electromagnet, rectifying means arranged whereby said latter electromagnet can only be energized by alternations of said same polarity of said current transmitted between stations in a direction opposite to the aforementioned direction, and means cooperating with said rectifying means for causing said two selecting means to operate in predetermined relation comprising control contacts at said stations responsive to said selecting means and controlling the energization of the electromagnets at the opposite stations.

JAMES R. HARRINGTON.